July 19, 1966  M. J. PURETIC  3,261,176
FISHING VESSEL
Filed April 9, 1964  4 Sheets-Sheet 1

INVENTOR.
MARIO J. PURETIC
BY Fulwider, Patton, Rieber
Lee, and Utecht
ATTORNEYS July 19, 1966  M. J. PURETIC  3,261,176
FISHING VESSEL
Filed April 9, 1964  4 Sheets-Sheet 2
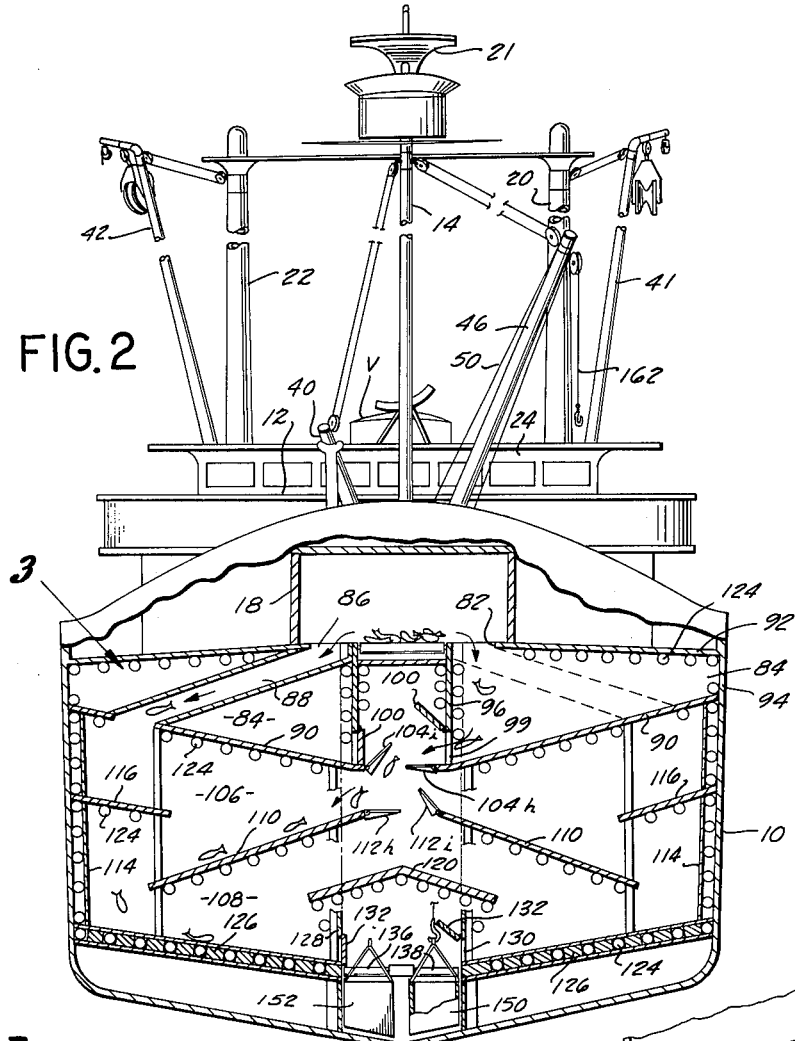
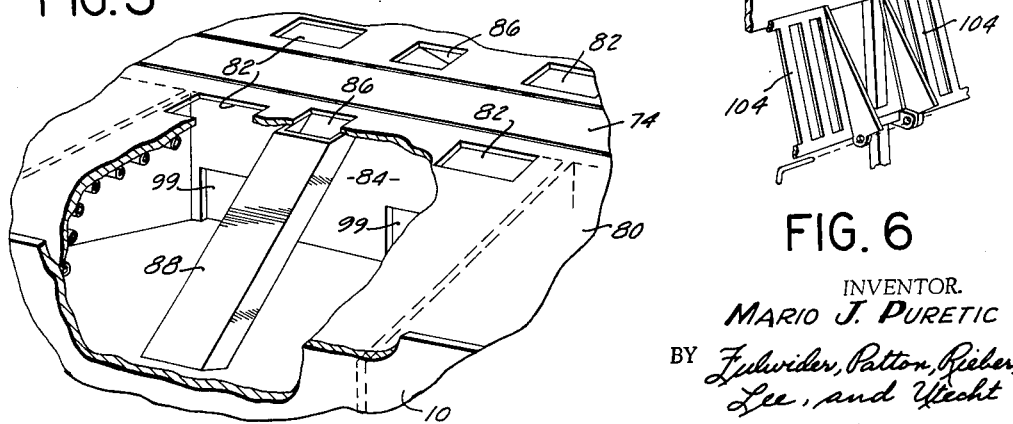
INVENTOR.
MARIO J. PURETIC
BY Fulwider, Patton, Rieber,
Lee, and Utecht
ATTORNEYS July 19, 1966  M. J. PURETIC  3,261,176
FISHING VESSEL
Filed April 9, 1964  4 Sheets-Sheet 3
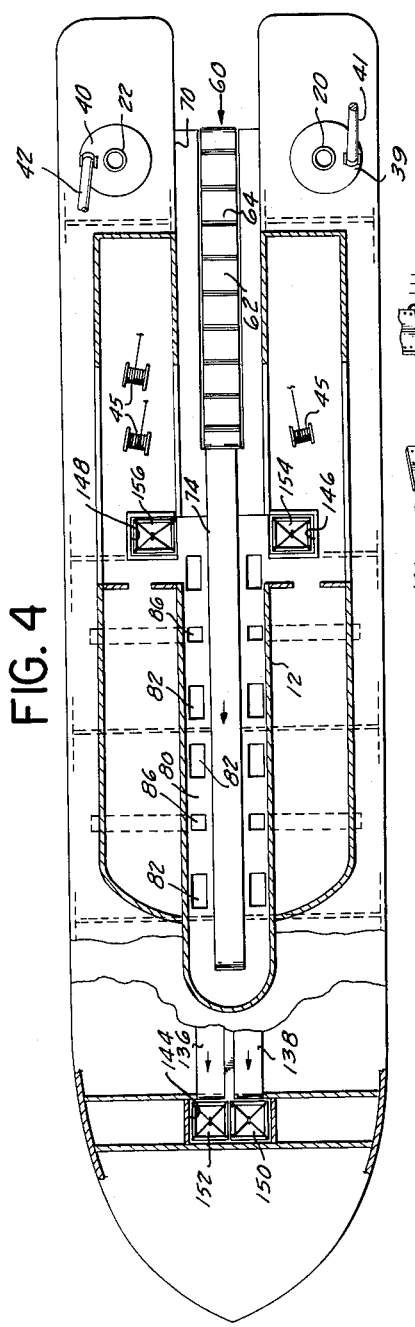
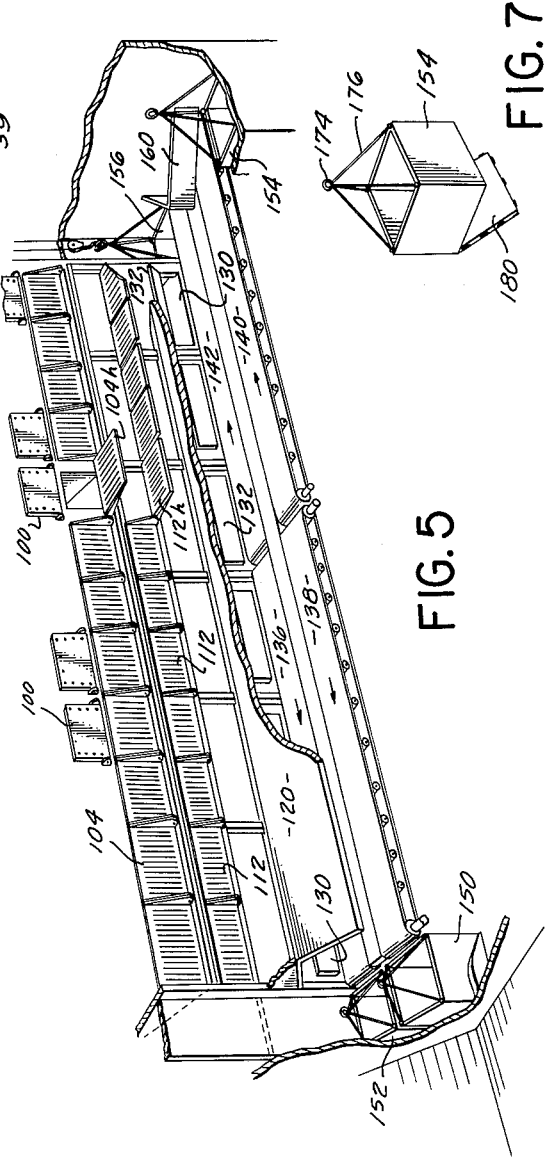
INVENTOR.
MARIO J. PURETIC
BY Fulwider, Patton, Rieber,
Lee, and Utecht
ATTORNEYS July 19, 1966   M. J. PURETIC   3,261,176
FISHING VESSEL
Filed April 9, 1964   4 Sheets-Sheet 4

INVENTOR.
MARIO J. PURETIC
BY
ATTORNEYS

United States Patent Office 3,261,176
Patented July 19, 1966

3,261,176
FISHING VESSEL
Mario J. Puretic, 901 E. 27th St.,
Long Beach, Calif. 90806
Filed Apr. 9, 1964, Ser. No. 377,148
12 Claims. (Cl. 62—240)

This is a continuation-in-part of my patent application Serial No. 348,054, filed February 28, 1964, and now abandoned.

The present invention relates generally to the art of fishing and more particularly to a novel fishing vessel designed to provide maximum efficiency in capturing, loading, freezing, storing and subsequent unloading of fish.

A fundamental and novel advance in the art of fishing is disclosed in my United States Letters Patent Nos. 2,733,530 and 2,733,531, issued February 7, 1956. These patents relate to an apparatus and method for drawing a net alongside a fishing vessel by means of a power-driven block suspended from a boom on the vessel. The use of such power-driven block has greatly expedited the hauling in of the net alongside the vessel and it has been possible in many cases to substantially reduce the number of men required for a commercial fishing vessel crew. In my United States Letters Patent No. 3,091,880, issued June 4, 1963, there is shown a conveyor belt located on the stern of a fishing vessel which is utilized to transfer fish from a net into the fish-receiving hold or holds of the fishing vessel.

It is a major object of the present invention to provide a fishing vessel equipped to utilize my aforedescribed power-driven block and stern conveyor belt for capturing fish whereafter such captured fish are frozen, loaded and subsequently unloaded in a unique manner.

It is another object of the present invention to provide a fishing vessel which permits loading and unloading of the fish to be accomplished with a minimum expenditure of labor and in a minimum period of time to thereby afford major economic savings.

A more particular object of the present invention is to provide a fishing vessel having fish freezing means arranged above a cold storage area, with frozen fish being transferred from the freezing means to the cold storage area automatically under the influence of gravity.

Another object of the present invention is to provide a fishing vessel wherein the fish are unloaded from a cold storage area automatically under the influence of gravity, with such fish thereafter being unloaded from the vessel entirely by power-operated mechanisms.

It is yet another object of the present invention to provide a fishing vessel having a cold storage area wherein are arranged inclined gravity walls that serve to automatically load the fish in a prearranged pattern, with such gravity walls also preventing the fish from undergoing physical damage.

Another object of the present invention is to provide a fishing vessel that utilizes conveyor belt means and elevators for quickly loading and unloading fish.

An important object of the present invention is to provide a fishing vessel having a stern conveyor for loading fish on the vessel and a bow conveyor for unloading fish from said vessel.

These and other objects and advantages of the present invention will become apparent from the following detailed description, when taken in conjunction with the appended drawings, wherein:

FIG. 2 is a vertical sectional view taken along line 2—2 of FIG. 1 in enlarged scale;

FIG. 3 is a fragmentary perspective view taken partly in section from the point designated 3 in FIG. 2 and showing a fish topping tube of said fishing vessel;

FIG. 4 is a top plan view taken partly in section of said fishing vessel;

FIG. 5 is a fragmentary perspective view taken partly in section showing a detail of the construction of said fishing vessel;

FIG. 6 is a fragmentary perspective view showing a hinge cover of said fishing vessel;

FIG. 7 is a perspective view showing an elevator utilized on said vessel;

Figure 1:
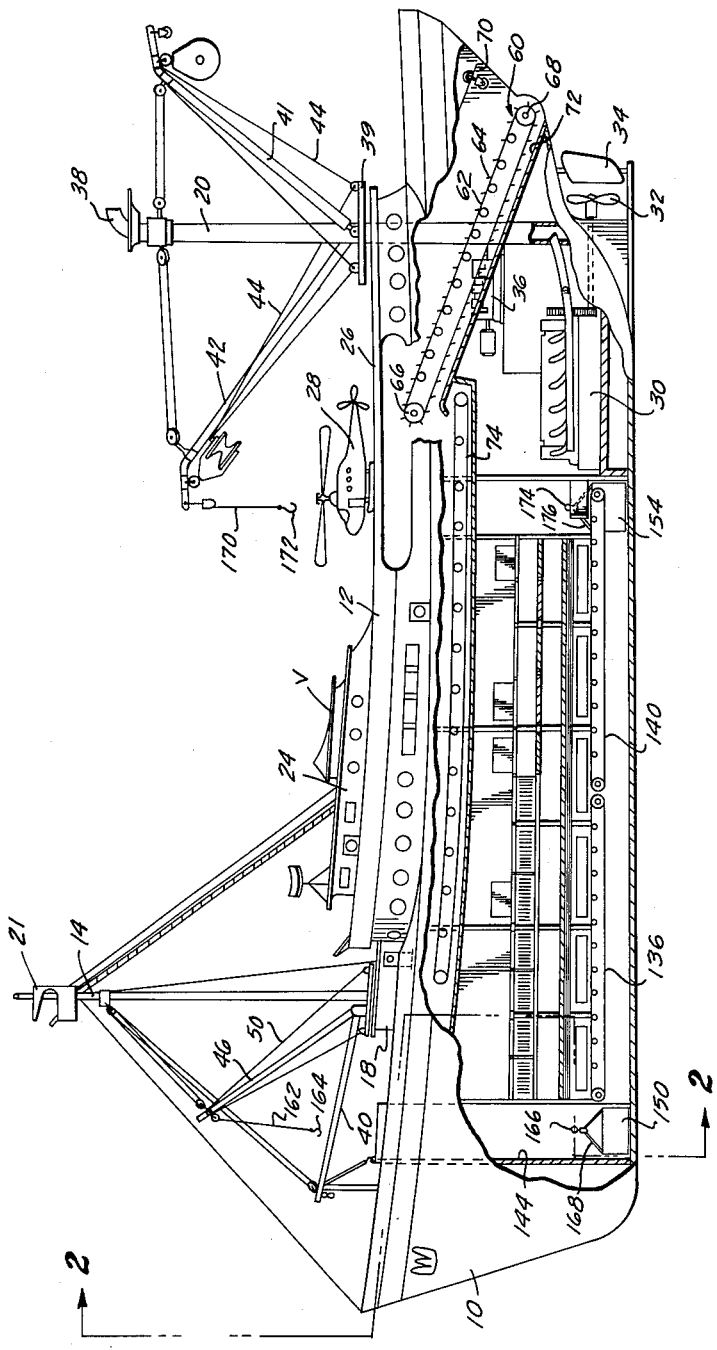
FIG. 1 is a side elevational view taken partly in section showing a preferred form of fishing vessel embodying the present invention.

Referring to the drawings and particularly FIG. 1 thereof, there is shown a preferred form of fishing vessel V embodying the present invention. The fishing vessel V includes a hull 10 provided with a deck house 12 wherein are located the crew quarters, galley and storage. The hull is also provided with a forward mast mounted on a mast base house 18. The hull 10 is also provided at its rear portion with a pair of transversely aligned Sampson posts 20 and 22. A crow's nest 21 is positioned at the upper portion of the mast 14. The portion of the deck house 12 aft of the wheel house 24 may define a landing deck 26 for a helicopter 28.

One or more engines 30 are positioned within the aft portion of the hull 10 to drive one or more screws 32. A rudder 34 is mounted in a conventional manner aft of the screw means 32. Refrigeration machinery 36 is also mounted within the aft portion of the hull 10. As indicated in FIGURE 1, the exhaust pipes of the engine means 30 may discharge into one or both of the Sampson posts 20 and 22, with the upper end of each such Sampson post being formed with an aft-facing stack 38.

The Sampson posts 20 and 22 each pivotally support a turntable 39, 40 that in turn carry the lower end of a pair of stern booms designated 41 and 42, respectively. Conventional cable rigging 44 is provided to permit the free ends of the booms 41 and 42 to be raised and lowered relatively to the boat. Additionally, the turntables 39 and 40 permit the booms 41 and 42 to be alternatively positioned with their free ends extending aft as indicated by the position of boom 41 in FIGS. 1 and 4, or forwardly as indicated by the position of the boom 42 in these figures. Each stern boom supports a power-driven block B of the type disclosed in my aforementioned Patents Nos. 2,733,530 and 2,733,531. Slanted winches 45 are provided for pursing the net. The mast base house 18 supports a pair of booms 46 and 48, with conventional cable rigging 50 being provided to control the position of such booms.

The stern portion of the vessel V is provided with a conveyor belt unit, generally designated 60, which may be similar to the conveyor belt unit disclosed in my aforementioned Patent No. 3,091,880. This conveyor belt unit 60 includes an endless belt member 62 preferably provided with transverse ribs 64 at longitudinally spaced points along its outer side. The belt 62 is supported between a horizontal upper roller 66 and a horizontal lower roller 68. Either the upper roller 66 or the lower roller 68 or both of such rollers may be driven in a conventional manner as by a hydraulic or electric motor.

The conveyor belt unit 60 is disposed within an upwardly and forwardly inclined tunnel 70 formed through the transom of the hull 10. The lower extremity of the tunnel 70 is defined by a bottom wall 72 that extends forwardly and upwardly relative to the vessel's hull 10. As indicated in FIG. 1, the forward portion of the tunnel base wall 72 and the stern conveyor belt unit 60 overhangs the aft end of a longitudinally extending fish distributing conveyor belt 74 disposed at the center-line of the vessel's hull 10. The conveyor belt 74 is adapted to receive fish from the upper end of the stern conveyor belt 60 and transport such fish forwardly through the upper interior portion of the hull 10.

The conveyor belt 74 moves along the mid-portion of a fish-receiving deck 80 disposes within the deck house 12. This fish-receiving deck 80 is provided with a plurality of openings 82 that permit access to a plurality of longitudinally spaced quick freezing brine compartments 84 located below the fish-receiving deck 80. The fish-receiving deck 80 is also provided with a second plurality of openings 86 that permit access to a plurality of longitudinally spaced topping tubes 88.

The quick freezing brine compartments 84 are refrigerated in a conventional manner whereby fish dropped thereinto through the openings 82 will be frozen in a short period of time. These compartments are seen to extend outwardly from either side of the fish loading conveyor belt 74, and each compartment 84 includes a lower, downwardly and inwardly inclined wall 90, an upper wall 92, an outboard wall 94 which may be defined by the skin of the vessel's hull 10 and an inboard generally vertically extending wall 96. The latter wall 96 is in general alignment with an edge of the fish loading conveyor belt 74. Referring to FIGS. 2 and 3, it should be particularly noted that the lowermost portion of each inboard wall 96 is provided with a pair of discharge apertures 99 normally closed by gate 100 having its upper portion hingedly connected to the wall 96. Each gate 100 opens upwardly from a normal position depicted by the left-hand gate 100 in FIG. 2 to an open position depicted by the right-hand gate 100 in FIG. 2. When urged to an open position, the gates 100 permit frozen fish to be released from the quick freezing brine compartments 84. It should be understood that the brine solution will have been withdrawn from such compartment 84 prior to the time that the fish are released therefrom. An important feature of the present invention is the provision of the downwardly and inwardly sloping lower walls 90 which permit the frozen fish to drop out of the freezing compartments 84 under the influence of gravity.

With further reference to FIG. 2 and additionally to FIGS. 5 and 6, the frozen fish released from the discharge apertures 99 of the freezing compartments 84 will move over deflector plates 104. Each deflector plate 104 has its outboard edge pivotally secured to the inboard extremity of the lower wall 90 of the freezing compartment 84 whereby such plate may be either positioned horizontally, as indicated by reference numeral 104h in FIG. 2, or at an inclined angle, as indicated by the reference numeral 104i in FIG. 2.

Each freezing compartment 84 discharges frozen fish into an upper storage compartment 106 disposed immediately below its respective freezing compartment, as shown in FIG. 2. Positioned below each upper storage compartment is a lower storage compartment 108. Each of the upper and lower storage compartments are separated by an outwardly and downwardly inclined intermediate deflector wall 110. The upper edge of each such deflector wall 110 is provided with a deflector plate 112 similar to the aforedescribed deflector plates 104, as shown in FIGS. 2 and 5. The deflector plates 112 may either be positioned horizontally as indicated by reference numeral 112h in FIG. 2, or at an inclined angle as indicated by reference numeral 112i in FIG. 2. With continued reference to this latter figure, it will be observed that the outboard edges of the deflector walls 110 terminate inwardly of the common outer walls 114 of the upper and lower storage compartments. An upper outwardly and downwardly extending deflector wall 116 is positioned at the outer portion of each side of the upper storage compartment 106. The inboard edge of such upper deflector walls 116 overlie the outboard edges of the aforementioned intermediate deflector walls 110. A lower deflector wall 120 of inverted generally V-shaped configuration is positioned at the mid-portion of the lower storage chamber compartment 108, with its apex arranged on the center line of the vessel's hull 10.

It should be understood that the various freezing compartments 84 and their corresponding upper and lower storage compartments 106 and 108 may be separated by means of suitable bulkheads 122. It should be further understood that conventional refrigeration coils 124 are provided for cooling the freezing compartments 84 and the upper and lower storage compartments. A number of such coils 124 may be arranged at the underside of the walls 90, 110, 116 and 120. Such coils may also be arranged outwardly of the outboard walls 114 and downwardly of the lower walls 126 of the storage compartments. Suitable insulation will be provided between the storage compartments 106 and 108 and the hull 10 of the vessel. The storage compartments 106 and 108 will preferably provide dry storage for the frozen fish. It would be possible, however, to utilize a spray refrigeration system such as shown in my United States Letters Patent No. 2,982,108, issued May 2, 1961, in these storage compartments.

Referring again to FIGURE 2, and with additional reference to FIGS. 1 and 5, the inboard walls 128 of the lower storage compartment 108 are provided with one or more discharge apertures 130. Each discharge aperture 130 is normally closed by a gate 132 having its upper edge hingedly connected to its respective inboard wall 128 above aperture 130. Each gate 132 opens upwardly from a normal position depicted by the left-hand gate 132 in FIG. 2 to an open position depicted by the right-hand gate 132 in this figure. When urged to an open position the gates 132 permit fish to be released from the lower storage compartment 108.

Two pairs of transversely aligned fish-unloading conveyor belts 136, 138 and 140, 142 are provided to unload the fish from the lower storage compartment 108. The forward pair of unloading conveyor belts 136 and 138 transfer fish from the forward storage compartments 108 forwardly towards forward elevator shaft 144, while the rear pair of unloading conveyor belts 140 and 142 transfer fish from the aft lower storage compartments 108 towards a pair of aft elevator shafts 146 and 148. It will be understood that the aforementioned unloading conveyor belts are power-driven in a conventional manner.

The forward elevator shaft 144 receives a pair of elevators 150 and 152, while the aft elevator shafts 146 and 148 are provided with a similar pair of elevators 154 and 156, respectively, as indicated particularly in FIGS. 4 and 5. When the elevators 150, 152, 154 and 156 are disposed in their lowermost position, their upper edges will be at the same or a somewhat lower elevation than the elevation of the unloading conveyor belts 136, 138, 140 and 142. Accordingly, fish from such conveyor belts will be movable freely into the confines of these elevators. With particular reference to FIG. 5, it should be noted that a horizontal, generally V-shaped guide 160 is provided to deflect fish from the aft conveyor belts 140 and 142 outwardly into the confines of the aft elevators 146 and 148.

The forward elevators 150 and 152 are adapted to be moved vertically by means of the forward booms 46 and 48, such booms being provided with lifting cables 162 to which are secured lifting hooks 164. The latter are engageable with complementary eyes 166 formed at the upper end of elevator bridles 168. The aft elevators 154 and 156 are moved vertically by means of the stern booms 41 and 42 when the latter are arranged in a forwardly extending position. The stern booms 41 and 42 are provided with conventional lifting cables 170 secured to lifting hooks 172. The lifting hooks 172 are engageable with complementary eyes 174 arranged at the upper end of elevator bridles 176. As indicated in FIG. 7, each of the elevators 150, 152, 154 and 156 may take the general form of a bucket having a hinged lower wall 180 that is moved from a closed, horizontal position to an open, inclined position shown in this figure to unload fish from within such elevator.

In the operation of the aforedescribed fishing vessel V, a fish net (not shown) is gathered towards the stern of the vessel by means of the power blocks P mounted on the stern booms 41 and 42. The fish within the net are then transferred onto the lower end of the stern conveyor unit 60 in the manner disclosed in my aforementioned Patent No. 3,091,880. The fish from the net are moved upwardly and forwardly by means of the conveyor belt 62 onto the aft end of the fish distributing conveyor belt 74. Fish dropped onto the aft end of the latter conveyor belt are moved forwardly along the midportion of the fish-receiving deck 80. Fish from the belt 74 are urged into the freezing compartments 84 by means of the openings 82. It will be understood that the fish are quick-frozen within the freezing compartments 84 in a conventional manner.

Referring now particularly to FIG. 2 and assuming the lowermost storage chamber is initially empty, after the fish deposited therein are frozen, the brine will be removed from the right-hand freezing chamber 84 shown in this figure. Thereafter, the gate 100 will be opened. At this time the right-hand deflector plate 104h will be arranged in a horizontal position. Frozen fish from the right-hand freezing compartment 84 will slide downwardly out of this freezing compartment through the discharge apertures 99 over the deflector plate 104h and towards the upper portion of the left-hand intermediate deflecting wall 110, all as indicated in FIG. 2. Deflector plate 104i is, of course, arranged at an angular position to permit such movement of fish. The fish will then slide downwardly over the left-hand intermediate deflector wall 110 and off the outboard edge thereof so as to enter the left-hand portion of the lower storage compartment 108. The fish will then slide downwardly along the lower wall 126 of the left-hand portion of the lower storage chamber 108 so as to come to rest against the inboard wall 128 of this chamber. It should be particularly noted that the aforedescribed movement of fish out of the freezing compartment 84 and into the lower storage compartment 108 takes place under the influence of gravity because of the provision of the slanted gravity walls 90, 110 and 126.

After the frozen fish have filled the right-hand portion of the lower storage chamber 108 to approximately the elevation of the lower edge of the intermediate deflector wall 110, the fish will begin filling the left-hand portion of the upper storage chamber 106. When the frozen fish have filled the left-hand portion of the upper storage chamber 106 to approximately the elevation of the inboard edge of the upper deflector wall 116, the deflector 112h connected to the inboard edge of the left-hand intermediate deflector wall 110 will be raised. Thereafter, frozen fish moving downwardly from the inboard edge of the deflector plate 104h will drop onto the left-hand leg of the lower deflector wall 120 so as to fill the upper right-hand portion of the lower storage chamber 108. The upper left-hand portion of the upper storage chamber 106 will be filled by means of the fish-topping tubes 88, as indicated particularly in FIG. 2. The fish dropped through the openings 86 of the fish-topping tubes 88 will be removed from the upper portion of one of the freezing compartments 84. This same sequence of steps will be followed in order to fill the other upper and lower storage chambers 106 and 108 from the other freezing compartments 84. It is important to observe that since the fish-receiving deck 80 and its openings 82 and 86 are within the protective confines of the deck house 12, the vessel's personnel are protected from the elements during adverse weather conditions. Also, waves breaking over the vessel will not enter these openings.

When the fish are to be unloaded from the vessel V, the fish-unloading conveyor belts 136, 138, 140 and 142 will be actuated. The gates 132 will then be opened whereby fish will be discharged through the apertures 130 onto the unloading conveyor belts under the influence of gravity. Fish discharged onto the forward conveyor belts 136 and 138 will be transferred into the confines of the forward elevators 150 and 152. Similarly, fish which drop onto the aft conveyor belts 140 and 142 will be transferred into the aft elevators 154 and 156. Suitable controls will be provided for the four unloading conveyor belts so as to permit their individual start and stop actuation. The loaded elevators will be hoisted upwardly through their respective elevator shafts by means of the forward and stern booms. When the elevators have been so hoisted, their respective booms will be swung outwardly towards an unloading dock or the like (not shown) whereafter the elevators will be opened to release the fish contained therewithin. As each elevator has discharged its load of fish it is returned to the bottom of its respective elevator shaft for another load.

It should be particularly noted that the unloading of the fish from the storage compartments 106 and 108 will take place under the influence of gravity, such fish sliding over the various gravity walls 90, 110, 116, 120 and 126. Although it may be necessary to occasionally manually direct the fish by means of a pushing and pulling stick, it will not be necessary for personnel to lift the fish at any time. In this manner considerable reduction in the labor of loading and unloading fish is afforded, as well as an increase in labor efficiency and corresponding savings of time.

It should be further noted that the deflector walls 110, 116 and 120 serve as fish-supporting racks which prevent the tight packing of fish as well as preventing the fish from shifting in rough seas. In this manner physical damage to the fish is avoided. The aforedescribed arrangement also permits spacing of refrigeration coils 124 within the storage chambers 106, 108 in an efficient manner without requiring extra structure. The provision of these aforementioned deflector walls likewise insures that the frozen fish will not have to be dropped through such a height as to undergo physical damage. It will also be apparent that these deflector walls support the weight of the fish disposed thereabove with respect to the fish disposed therebelow. This is an important feature in avoiding damage to the loaded fish. It should also be observed that the positioning of the vessel's propulsion and refrigeration machinery without the lower aft portion of the hull 10 provides a clean unobstructed area forward of such machinery, such area being utilized for freezing and storing the fish. The use of a single large refrigerated storage area as compared to the usual arrangement wherein several small refrigerated areas are utilized permits a reduction in the load imposed upon the refrigeration equipment.

Figure 8:
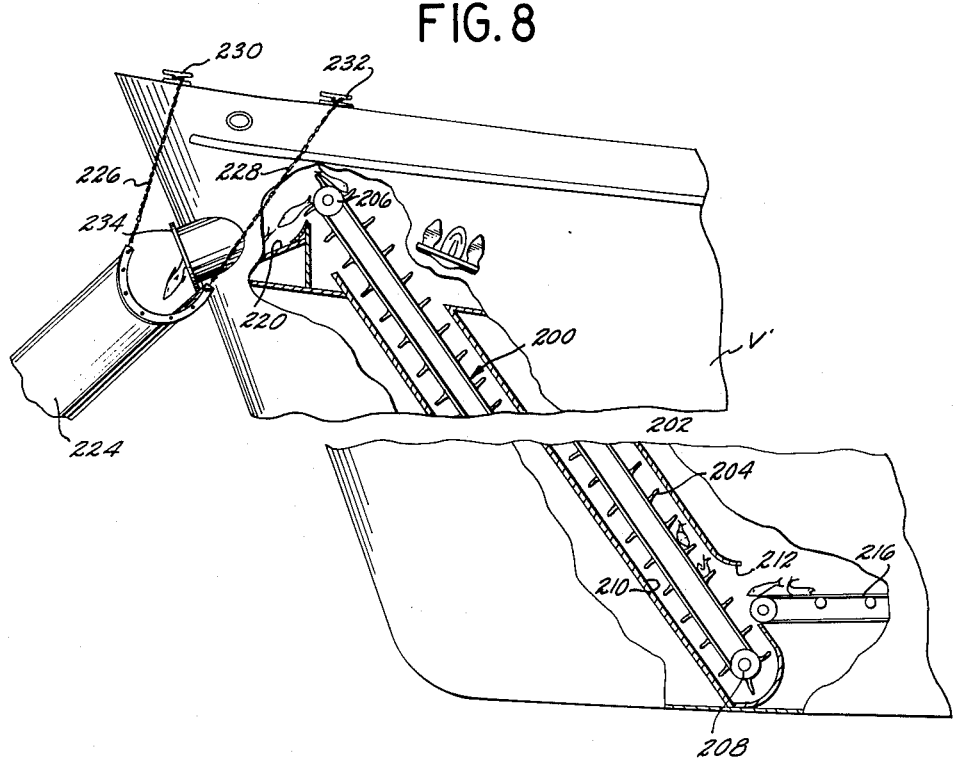
FIG. 8 is a partially broken away, fragmentary side elevational view of a modified form of fishing vessel embodying the present invention.
Figure 9:
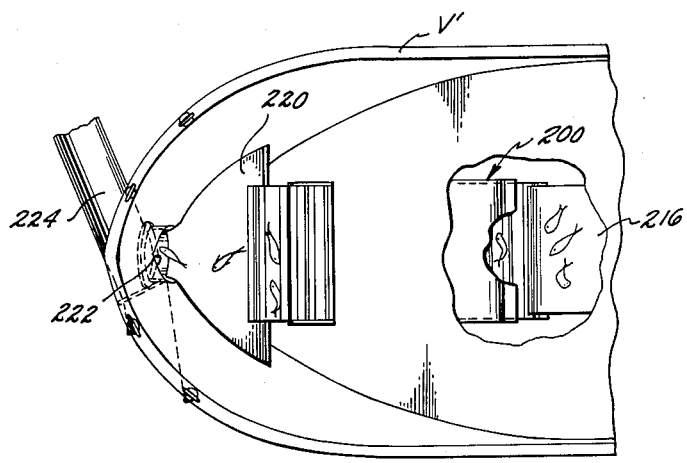
FIG. 9 is a fragmentary top view of the arrangement of FIG. 8.

Referring now to FIG. 8 and FIG. 9, there is shown another form of fishing vessel V' embodying the present invention. The bow portion of the fishing vessel V' is not provided with the elevators 150 and 152 shown in the form of vessel of FIGS. 1 through 7. Instead, there is provided a bow conveyor belt unit, generally designed 200. The bow conveyor belt unit 200 includes an endless belt member 202 preferably provided with transverse ribs 204 at longitudinally spaced points along its outer side. The belt 202 is supported between a horizontal upper roller 206 and a horizontal lower roller 208. Either the upper roller 206 or the lower roller 208 or both of such rollers may be driven in a conventional manner as by a hydraulic or electric motor.

The bow conveyor belt unit 202 is disposed within an upwardly and forwardly inclined tunnel 210 that extends along the center line of the vessel V'. The lower portion of the tunnel 210 is formed with an aft-facing opening 212, within the lower portion of which is disposed the front end of a single unloading conveyor belt 216 positioned in approximately the same location and serving the same fish unloading function as the unloading conveyor belts 136 and 138 of the embodiment of the invention shown in FIGS. 1 through 7. It should be particularly noted that the conveyor belt 216 preferably extends along the full length of the fish storage portion of the vessel V'. It should also be noted that in this modified form of the invention it is optional to provide the aft elevators 154 and 156 disclosed in the form of the invention shown in FIGS. 1 through 7.

The upper end of the bow conveyor belt 202 is disposed just aft of a forwardly tapered, downwardly inclined fish unloading chute 220. The chute 220 extends forwardly through the vessel's bow stem and is provided at its forward end with a fish discharge opening 222. A fish unloading chute 224 is adapted to receive fish from the fish discharge opening 222 of the chute 220 and to transfer such fish to an unloading point. The chute 224 is removably secured to the bow of the boat as by means of chains 226 and 228 having their upper ends releasably secured to cleats 230 and 232, respectively.

In the operation of the aforedescribed fishing vessel V', the fish discharge opening 222 of the hopper 220 is closed as by means of a removable cover (not shown) except when fish are to be unloaded from the vessel V'. This cover is preferably bolted on the flange 234 formed on the forward end of the chute 220. When the vessel V' is to be unloaded, the cover is simply unbolted from the flange 234. Thereafter, the unloading conveyor belt 216 transfers fish forwardly from the storage compartments 108 described hereinbefore and onto the lower portion of the bow conveyor belt 202. These fish are moved upwardly and forwardly by means of the bow conveyor belt 202 to drop onto the aft portion of the unloading chute 220. The fish then slide down the chute 220 under the influence of gravity and into the upper end of the chute 224. The fish will slide down the chute 224 to a suitable fish-receiving dock or the like.

It should be particularly noted that the chute 224 may be adjusted throughout a wide angle on either side of the bow of the vessel V'. This arrangement permits the fish to be discharged by simply tying the bow of the vessel V' to an unloading dock. Where the fish-receiving facility does not have dock facilities, the vessel V' may be anchored with the bow as near shore as possible. Thereafter, the fish may be unloaded from the vessel V' by simply positioning the free end of the chute 224 on shore.

It will be apparent to those skilled in the fishing art that the aforedescribed arrangement permits continuous uninterrupted flow of fish during the unloading process.

Various modifications and changes may be made with respect to the foregoing description without departing from the spirit of the present invention or the scope of the following claims.

I claim:
1. In a fishing vessel, the combination of:
a stern conveyor for removing fish from a net that is disposed adjacent the stern of said vessel;
a fish-receiving deck forward of said stern conveyor;
fish-distributing conveyor means that receive fish from said stern conveyor and moves said fish forwardly along said fish-receiving deck;
fish-freezing means accessible from and below said fish-receiving deck;
a refrigerated storage compartment below said freezing means that receives frozen fish from said freezing means under the influence of gravity;
and fish-unloading conveyor means that receive fish from said storage compartment under the influence of gravity.

2. In a fishing vessel, the combination of:
loading means for removing fish from a net that is disposed adjacent said vessel;
a fish-receiving deck;
fish-distributing conveyor means that receive fish from said loading means and moves said fish along said fish-receiving deck;
fish-freezing means accessible from said fish-receiving deck and having downwardly and inwardly inclined lower walls;
a refrigerated storage compartment below said freezing means that receives frozen fish from said freezing means under the influence of gravity, said storage compartment having downwardly and inwardly inclined lower walls;
and power-operated fish-unloading conveyor means that receive fish from said storage compartment under the influence of gravity.

3. In a fishing vessel, the combination of:
stern conveyor means for removing fish from a net that is disposed adjacent the stern of said vessel;
a fish-receiving deck extending forwardly of said stern conveyor means;
fish-distributing conveyor means that receive fish from said loading conveyor means and moves said fish forwardly along a fish-receiving deck;
fish-freezing compartment means accessible from said fish-receiving deck and having downwardly and inwardly inclined lower walls;
refrigerated storage compartment means below said fish freezing compartment that receives frozen fish from the latter, said fish moving out of said fish-freezing compartment under the influence of gravity, said storage compartment means having downwardly and inwardly inclined lower walls; and
fish-unloading conveyor means that receive fish from said storage compartment means under the influence of gravity.

4. In a fishing vessel, the combination of:
a fish-receiving deck;
power-operated means to load fish onto said deck;
refrigerated storage compartment means below said deck;
vertically spaced gravity wall means within said storage compartment that are downwardly inclined whereby fish deposited on the upper portions of said walls will move towards the bottom of said storage compartment under the influence of gravity;
and fish topping tubes extending downwardly from said deck into the upper side portions of said storage chamber.

5. In a fishing vessel, the combination of:
a fish-receiving deck;
power-operated means to load fish onto said deck;
refrigerated storage compartment means below said deck;
vertically spaced gravity wall means within said storage compartment that are downwardly inclined whereby fish deposited on the upper portions of said walls will move towards the bottom of said storage compartment under the influence of gravity;
discharge means formed in the lower portion of said storage chamber through which fish may be removed from said storage chamber;
fish-unloading conveyor means adjacent said discharge means to receive fish from said storage chamber;
and fish topping tubes extending downwardly from said deck into the upper side portions of said storage chamber.

6. In a fishing vessel, the combination of:
loading means for removing fish from a net that is disposed adjacent said vessel;
a fish-receiving deck;
fish-distributing conveyor means that receive fish from said loading conveyor means and moves said fish along said fish-receiving deck;

fish-freezing means below said fish-receiving deck and accessible therefrom;
refrigerated storage compartment means below said freezing means;
vertically spaced gravity wall means within said storage compartment that are downwardly inclined whereby fish deposited on the upper portion of said walls will move towards the bottom of said storage compartment under the influence of gravity;
and fish topping tubes extending downwardly from said deck into the upper side portions of said storage chamber.

7. In a fishing vessel, the combination of:
loading means for removing fish from a net that is disposed adjacent said vessel;
a fish-receiving deck;
fish-distributing conveyor means that receive fish from said loading conveyor means and moves said fish along said fish-receiving deck;
fish-freezing means below said fish-receiving deck and accessible therefrom;
refrigerated storage compartment means below said freezing means;
vertically spaced gravity wall means within said storage compartment that are downwardly inclined whereby fish deposited on the upper portion of said walls will move towards the bottom of said storage compartment under the influence of gravity;
fish-unloading conveyor means adjacent said discharge means to receive fish from said storage chamber;
and fish topping tubes extending downwardly from said deck into the upper side portions of said storage chamber.

8. In a fishing vessel, the combination of:
loading means for removing fish from a net that is disposed adjacent said vessel;
a fish-receiving deck;
fish-distributing conveyor means that receive fish from said loading means and moves said fish along said fish-receiving deck;
fish-freezing means accessible from said fish-receiving deck;
a refrigerated storage compartment that receives frozen fish from said fish-freezing means, said storage compartment being below said freezing means;
fish-unloading conveyor means below said storage chamber that receive fish from said storage compartment;
and upwardly inclined bow conveyor means that receive fish from said fish-unloading conveyor means and moves said fish upwardly out of the confines of said vessel.

9. In a fishing vessel, the combination of:
loading means for removing fish from a net that is disposed adjacent said vessel;
a fish-receiving deck;
fish-distributing conveyor means that receive fish from said loading conveyor means and moves said fish along said fish-receiving deck;
fish-freezing means below said fish-receiving deck and accessible therefrom;
a refrigerated storage compartment below said freezing means that receives frozen fish from said freezing means under the influence of gravity;
fish-unloading conveyor means below said storage chamber that receive fish from said storage compartment under the influence of gravity and move said fish forwardly;
and bow conveyor means that receive fish from said fish-unloading conveyor means and moves said fish upwardly out of the confines of said vessel.

10. In a fishing vessel, the combination of:
stern conveyor means for removing fish from a net that is disposed adjacent the stern of said vessel;
a fish-receiving deck extending forwardly of said stern conveyor means;
fish-distributing conveyor means that receive fish from said loading conveyor means and moves said fish forwardly along a fish-receiving deck;
fish-freezing compartment means accessible from said fish-receiving deck and having downwardly and inwardly inclined lower walls;
refrigerated storage compartment means below said fish freezing compartment that receives frozen fish from the latter, said fish moving out of said fish-freezing compartment under the influence of gravity, said storage compartment means having downwardly and inwardly inclined lower walls;
fish-unloading conveyor means that receive fish from said storage compartment means under the influence of gravity and move said fish forwardly;
and upwardly inclined bow conveyor means that receive fish from said fish-unloading conveyor means and moves said fish upwardly out of the confines of said vessel.

11. In a fishing vessel, the combination of:
loading means for removing fish from a net that is disposed adjacent said vessel;
a fish-receiving deck;
fish-distributing conveyor means that receive fish from said loading means and moves said fish along said fish-receiving deck;
fish-freezing means accessible from said fish-receiving deck;
a refrigerated storage compartment that receives frozen fish from said fish-freezing means, said storage compartment being below said freezing means;
fish-unloading conveyor means below said storage chamber that receive fish from said storage compartment;
upwardly inclined conveyor means that receive fish from said fish-unloading conveyor means and moves said fish upwardly;
and a hopper that receives fish from the upper end of said upwardly inclined conveyor means, said hopper having a discharge opening exterior of the confines of said vessel.

12. In a fishing vessel, the combination of:
loading means for removing fish from a net that is disposed adjacent said vessel;
a fish-receiving deck;
fish-distributing conveyor means that receive fish from said loading means and moves said fish horizontally along said fish-receiving deck;
refrigerated storage means for said fish below said fish-receiving deck that receives fish from said deck under the influence of gravity;
fish-unloading horizontal conveyor means below said refrigerated storage means that receives fish from said storage means; and
an upwardly inclined bow conveyor means that receives fish from said fish-unloading conveyor means and moves said fish upwardly out of the confines of said vessel.

References Cited by the Examiner

UNITED STATES PATENTS

| | | | |
|---|---|---|---|
| 307,484 | 11/1884 | McDonald | 62—240 |
| 382,052 | 5/1888 | Palmer | 198—54 |
| 796,406 | 8/1905 | Anderson | 214—13 |
| 1,186,159 | 6/1916 | Andvig | 62—240 |
| 1,427,091 | 8/1922 | Case | 214—12 |
| 1,805,354 | 5/1931 | Birdseye | 62—240 |
| 2,377,693 | 6/1945 | Johnston | 114—.5 |
| 2,413,918 | 1/1947 | Harris | 114—.5 |
| 2,513,004 | 6/1950 | Cooley | 62—240 |
| 3,091,880 | 6/1963 | Puretic | 43—8 |
| 3,113,394 | 12/1963 | Puretic | 43—8 |

WILLIAM J. WYE, *Primary Examiner.*